Figure 1:
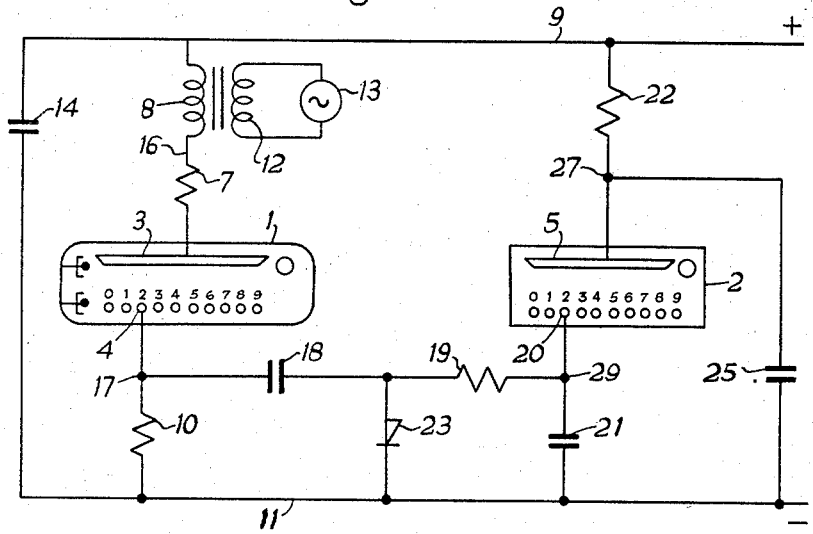

INVENTORS
NORBERT KITZ
JOHN GEORGE LLOYD
HUGH LYON MANSFORD
BY
ATTORNEYS

Sept. 27, 1960
N. KITZ ET AL
2,954,507
INDICATING DEVICES
Filed Feb. 26, 1959
5 Sheets-Sheet 2
Fig. 2.
Fig. 4.
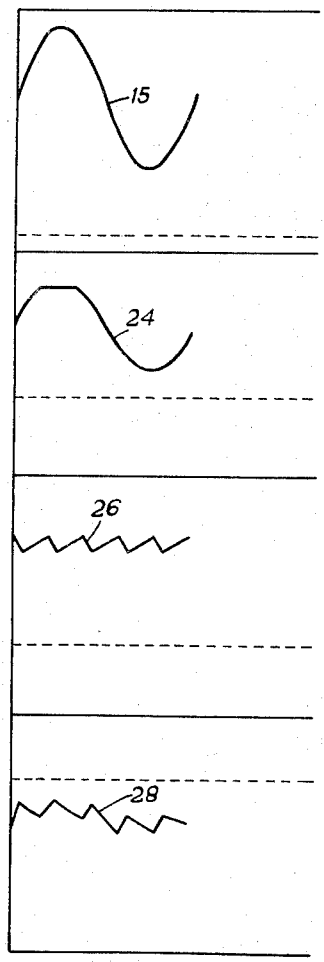
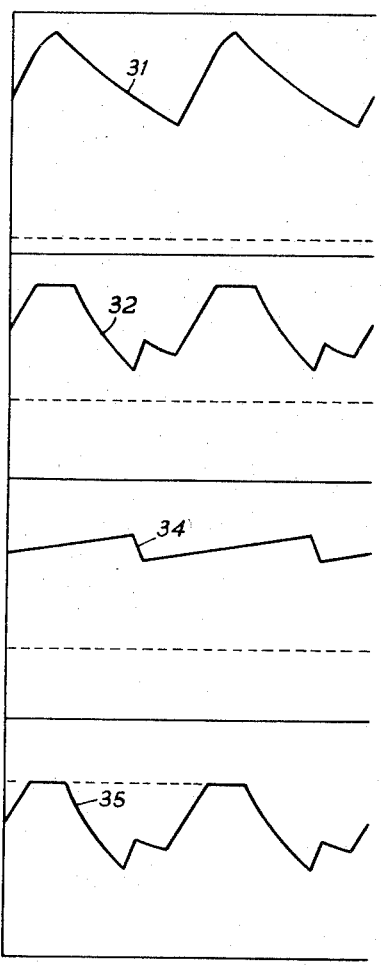
INVENTORS
NORBERT KITZ
JOHN GEORGE LLOYD
HUGH LYON MANSFORD
BY
ATTORNEYS United States Patent Office 2,954,507
Patented Sept. 27, 1960

2,954,507
INDICATING DEVICES

Norbert Kitz, John George Lloyd, and Hugh Lyon Mansford, London, England, assignors to Bell Punch Company Limited, London, England, a British company Filed Feb. 26, 1959, Ser. No. 795,664

Claims priority, application Great Britain May 3, 1958

21 Claims. (Cl. 315—135)

This invention is for improvements in or relating to a method of and/or means for transferring digital information registered upon a multi-cathode counting tube to a cold cathode indicating tube.

Multi-cathode counting tubes are employed as numerical indicators by arranging that a glow discharge can at will be positioned on any selected one of a plurality of cathodes (each cathode being indicative of, for example, one of the numerals 0 to 9), in order to indicate by the position of the glow the numeral which the tube is intended to register.

The glow upon the cathode of a multi-cathode counting tube can be visible, and its position around the circumference of a circle formed by a ring of cathode can convey, in some circumstances, to the mind of an observer sufficient indication to enable the person to determine which particular number of a series of numbers the glow on the cathode is intended to represent.

The provisions normally made to effect the transfer of a glow from one cathode of a multi-cathode counting tube to the next adjacent cathode, are not herein described as these are known.

It has been found desirable at times to display the number registered in a multi-cathode counting tube upon an ancillary numerical indicator.

It is the object of the present invention to display the numeral indicated by the registering cathode of a multi-cathode counting device upon a corresponding cathode of a cold cathode indicating tube.

In a cold cathode indicating tube, such as the tube known commercially as the Nixie HB-106, each cathode is shaped to the physical form of one of the numerals 0 to 9 and according to the present invention a multi-cathode counting tube is coupled to a cold cathode indicating tube so that the cathode of a cold cathode indicating tube corresponding to the glowing cathode of a multi-cathode counting tube is automatically caused to display the physical form of the numeral which the glowing cathode of the multi-cathode counting tube represents.

It will be appreciated that a multi-cathode counting tube normally has a current flowing to the glowing cathode thereof, which serves also to bias this cathode positively with respect to the remaining cathodes. This positive bias comprises the external electrical indication of the position of the glow and is employed according to the present invention to control the glow in a cold cathode indicating tube. The glow upon the cathode of a multi-cathode counting tube has a positive polarity which is opposite to the negative polarity on the cathode of the cold cathode indicating tube.

According to the present invention there is provided an electrical circuit including a multi-cathode tube, a cold cathode indicating tube and means interconnecting the cathodes of the said two tubes, wherein the said interconnecting means are operable to convert a positive potential resulting from a discharge between the anode and a glowing cathode of the multi-cathode counting tube into a negative potential at the corresponding cathode of the cold cathode indicating tube to draw a discharge between the anode and the cathode corresponding to the glowing cathode of the multi-cathode counting tube.

Further, according to the present invention there is provided an electrical circuit including a multi-cathode counting tube, a cold cathode indicating tube, and means interconnecting corresponding cathodes of the two tubes, wherein the said means derive from a glowing cathode of the multi-cathode counting tube a potential which assists in drawing the glow in the cold cathode indicating tube to the cathode thereof which corresponds to the glowing cathode of the multi-cathode counting tube.

Again, according to the present invention there is provided an electrical circuit in which a multi-cathode counting tube and a cold cathode indicating tube have the corresponding cathodes thereof interconnected by means operable in conjunction with the potential of the glowing cathode of the multi-cathode counting tube to apply to the cathode of the cold cathode indicating tube a potential of reversed polarity to that of the corresponding glowing cathode of the multi-cathode counting tube.

Figure 3:
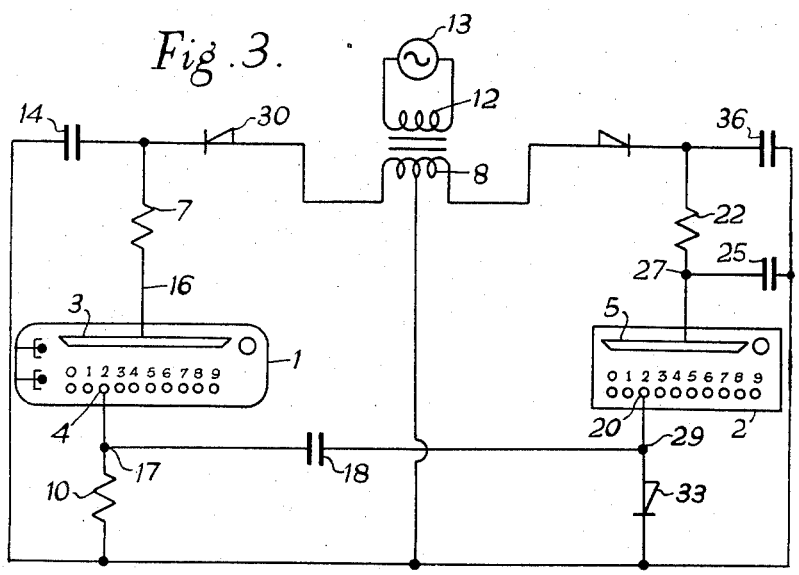

The invention will be hereinafter more particularly described with reference to the accompanying drawings in which:

Figures 1, 3, 5, 6 and 7 illustrate diagammatically four methods of carrying the invention into effect, and Figures 2 and 4 illustrate the phases through which the potentials applied to the anodes of the multi-cathode counting tubes pass in their paths to the cathodes of the cold cathode indicating tubes of Figures 1 and 3.

Referring to Figures 1 and 3 of the drawings, there is illustrated in Figure 1 an electrical circuit in which a multi-cathode counting tube 1 is connected to a cold cathode indicating tube 2 so that when a discharge is effected between the anode 3 and a cathode 4 of the multi-cathode counting tube a discharge is also effected between the anode 5 and the corresponding cathode 20 of the cold cathode indicating tube 2.

Referring to Figure 1, the anode 3 of a multi-cathode counting tube 1 is connected through a resistor 7 and a secondary winding 8 of a transformer to a positive lead 9 of a source of potential.

Each cathode of the multi-cathode counting tube 1 is connected to the corresponding electrode of a cold cathode indicating tube 2 by a corresponding circuit one of which will be hereinafter more particularly described with reference to the third cathode of both the multi-cathode counting tube 1 and the cold cathode indicating tube 2.

The third cathode 4 of the multi-cathode counting tube 1 is connected through a resistor 10 to a negative lead 11 of the said source of potential. The flow of current to the cathode 4 is maintained at any desired value by the resistor 7.

The secondary winding 8 of the transformer is fed with an alternating current from a primary winding 12 and a generator 13. The alternating current traverses a circuit including a capacitor 14, cathode resistor 10, the multi-cathode counting tube 1 and the resistor 7. In this way the direct current flow between the anode 3 and the glowing cathode 4 is modulated. The alternating current may be so adjusted in value that the sum of the currents is unidirectional but varying in value from zero to twice the mean value. This may be considered as the condition of maximum modulation, but it is not a condition essential to the operation of the system.

Figure 2 illustrates the waveform 15 of the potential at the junction 16 of the secondary winding 8 with the resistor 7.

The waveform 24 of Figure 2 represents the potential at junction 17 of the cathode 4 of the multi-cathode counting tube and the resistor 10. The scale of the waveform 24 is not the same as that of the waveform 15, The cathode 4 of the multi-cathode counting tube 1 is coupled by the capacitor 18 through a series resistor 19, to the corresponding third cathode 20 of the cold cathode indicating tube 2 which is provided with a decoupling capacitor 21. An anode resistor 22 for the cold cathode indicating tube 2 regulates the glow discharge current therein, which in the absence of a directive signal from the multi-cathode counting tube 1 will flow at the same time to several or all of the cathodes of the cold cathode indicating tube 2. A diode 23 and the resistor 19 complete the direct current cathode path of the cold cathode indicating tube 2.

The alternating current from the secondary 8 of the transformer flows in the resistor 10 to give rise at the junction of the resistor 10, the cathode 4 and the capacitor 18 to a fluctuating potential 24 (Figure 2), which is applied through the capacitor 18 to the diode 23, so that the capacitor 18 becomes negatively charged on the terminal thereof which is connected to the diode 23. This negative charge, shared by capacitor 21, is connected to the third cathode 20 of the cold cathode indicating tube 2. The resistor 19 serves to smooth out the pulsations of the potential which occur at the diode 23. The application of the negative potential to cathode 20 of the cold cathode indicating tube 2 attracts the glow discharge to the cathode 20.

It will be observed that all the cathode glow current passed by the cathode 20 flows in the resistor 19 and must therefore pass through the diode 23. But the conducting duty cycle for the diode 23 must be short, and preferably less than half a cycle of the alternating current source, otherwise the mean negative charge transferred to capacitor 21 will be inadequate. This necessitates the peak glow current of multicathode counting tube 1 having a value of at least twice the mean current value for the cold cathode indicating tube 2 which proves to be a severe limitation because the characteristics of a cold cathode indicating tube are such that the area of the cathode covered by the glow falls as the current flow is reduced, until parts of the selected cathode are invisible, whilst other parts retain a more than adequate glow.

The elimination of this fault is achieved by providing a capacitor 25 between the anode 5 of the cold cathode indicating tube 2 and the junction of the negative lead 11 of the source of potential with the capacitor 21. This permits the mean current of the cold cathode indicating tube 2 to be controlled by adjusting the value of the resistor 22 so that it suits the limitations imposed by the rating of the multi-cathode counting tube.

By employing the above means the risk of only a part or parts of the cathodes of the cold cathode indicating tube showing a glow discharge is eliminated and is achieved by the employment of short bursts rather than a continuous discharge of current through the discharge path.

In common with all cold cathode gas discharge tubes, the cold cathode indicating tube necessitates a maintaining potential which is less than the striking potential. This permits the cold cathode indicating tube to operate as a relaxation oscillator, alternately discharging the capacitor 25 at a current value adequate to cover the whole cathode with a glow, followed by a non-conducting period during which the capacitor 25 re-charges to the striking potential. The frequency is governed by the time constant C(25) R(22) which is adjusted to be fast enough to avoid flicker. The waveform 26 of Figure 2 indicates the potential at the junction 27 of the capacitor 25 with the resistor 22 and the anode 5, whilst the waveform 28 indicates the potential at the junction 29 of the resistor 19 with the third cathode 20 of the cold cathode indicating tube and the capacitor 21.

Alternatively, this automatic relaxation oscillation of the current in the cold cathode indicating tube 2 may be replaced by current fluctuations provided by an external source of alternating current, such as may be provided by coupling to the generator 13 or to the supply mains.

In the circuit arrangement illustrated in Figure 3 the components thereof serving like functions to those hereinbefore described with reference to Figure 1, are indicated by the same reference numerals. An alternating current from a generator 13 is fed via transformer primary and secondary windings 12 and 8 to a rectifying diode 30. Values are chosen for the resistor 7 and the capacitor 14 such that the current in the multi-cathode counting tube 1 falls almost to zero value during the half cycle during which the diode 30 is not conducting. The waveform 31 Figure 4 indicates the anode potential at the junction 16 of the resistor 7 with the anode 3. The arrangement illustrated in Figure 3 ensures that the potential waveform of the anode 3 is susbtantially the same as that for the circuit operating cycle of Figure 1.

The cathode coupling circuit of the multi-cathode counting tube 1 to the cold cathode indicating tube 2 of Figure 3 follows the circuit arrangement of Figure 1 with the omission of the resistor 19 and shunt capacitor 21. This has the effect of feeding the cathode 20 of the cold cathode indicating tube with a potential which comprises a combination of the alternating current waveform from the cathode 4 of the multicathode counting tube 1 (indicated by the waveform 32 of Figure 4), with a direct current component provided by the rectifying diode 33. The combination of the two potentials is indicated by the waveform 35 (Figure 4). The omission of the resistor 19 disposes of the loss of the bias potential which arises from the glow current of the cathode 20.

It is now essential, however, that the passage of the current by cathode 20 be synchronized to occur only at or near to the negative peaks of the cathode potential waveform. This is readily achieved by controlling the potential of the anode of the cold cathode indicating tube in a manner similar to that employed for the multicathode counting tube 1, but from an alternating potential source phased one half cycle later.

Further, the value of the resistor 22 and a capacitor 36 are chosen so that the potential fed to the anode 5 of the cold cathode indicating tube is direct, plus a considerable alternating potential component of the supply frequency.

The shunt capacitor 25, together with the series resistor 22, serve to smooth the ripple potential at the anode 5 of cold cathode indicating tube 2 but sufficient ripple will remain to "strike" the glow by forcing this additional anode potential at the time when the potential of the cathode 20 is in the neighbourhood of the most negative point of its path. The waveform 34 of Figure 4 is representative of this anode potential, while the waveform 35 (Figure 4) shows the potential waveform at the junction of the capacitor 18 with the cathode 20 and the diode 33.

The discharge period of the capacitor 25 is short in relation to the time of a full cycle, so that a discharge takes place which has characteristics similar to those of the circuit illustrated in Figure 1, but with a timing controlled by the generator 13, which ensures that a flow of short duration is localised on the cathode 20.

Figure 5:
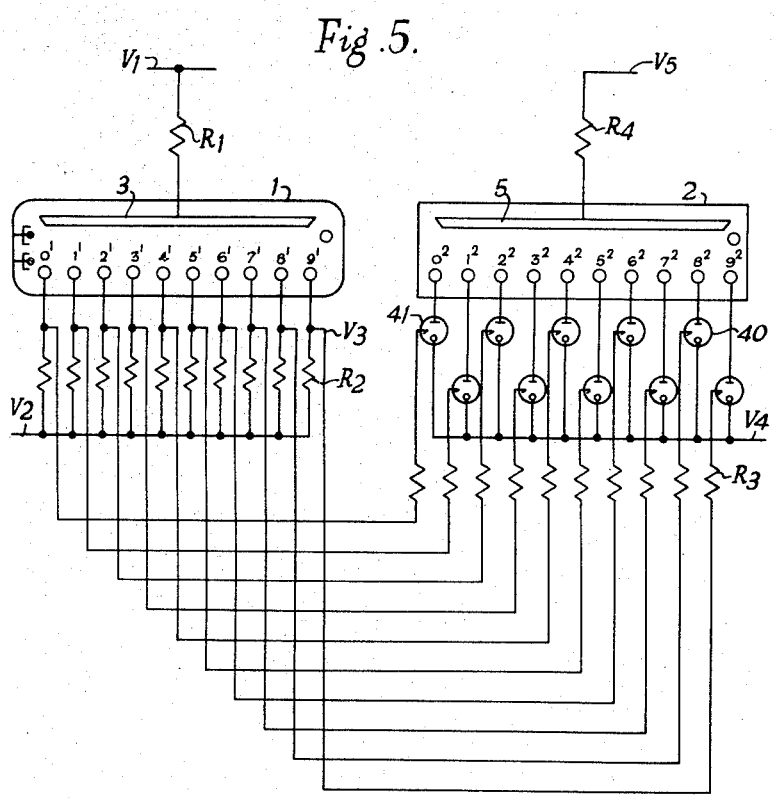

A further method of applying a negative potential to the cathode of a cold cathode indicating tube which corresponds to a glowing electrode of a multi-cathode counting tube is diagrammatically illustrated in Figure 5 of the accompanying drawings in which a multi-cathode counting tube 1 has the cathodes $0^1$ to $9^1$ thereof connected to the cathodes $0^2$ to $9^2$ of a cold cathode indicating tube 2. The anode 3 of the multi-cathode counting tube 1 is connected to a source of potential $V_1$ through a resistor $R_1$, whilst the cathodes $0^1$ to $9^1$ are each connected to a source of potential $V_2$ through a resistor $R_2$. The resistors $R_1$ and $R_2$ and the potential difference $V_1$ to $V_2$ are chosen so as to ensure the effective operation of the multi-cathode counting tube 1. The anode 5 of the cold cathode indicating tube 2 is connected to a source of potential $V_5$ through a resistor $R_4$ and the cathodes $0^2$ to $9^2$ of the cold cathode indicating tube 2 are each connected through a trigger tube 40 to a source of potential $V_4$, whilst the trigger electrode 41 of each of the trigger tubes 40 is connected through a resistor $R_3$ to the corresponding electrode $0^1$ to $9^1$ of the multi-cathode counting tube 1. The potential difference $V_2$ to $V_4$ is just insufficient to strike the trigger tubes 40. The potential $V_5$ conected to the anode 5 of the cold cathode indicating tube 2 has an alternating potential superimposed upon it so that upon each cycle both the outline of the numbers of the cathodes and the corresponding trigger tubes 40 are extinguished. The value of the resistor $R_4$ is such as to limit the peak current through the cold cathode indicating tube 2 to the correct value thereof whilst the resistors $R_3$ connected between the trigger electrodes of the trigger tubes 40 and the corresponding electrodes of the multi-cathode counting tubes are of high value.

When a glow is arrested upon a selected cathode of the multi-cathode counting tube 1 its potential moves from $V_2$ to $V_3$ and the potential difference $V_3$ to $V_4$ is thereupon sufficient to strike the trigger tube 40 connnected to the glowing cathode of the multi-cathode counting tube 1. During the subsequent positive excursions of the voltage $V_5$, current flows through the trigger tube and the corresponding cathode of the cold cathode indicating tube, thereby displaying the number outlined by the cathode of the cold cathode indicating tube.

When the glow upon one cathode of a multi-cathode counting tube moves to the next adjacent cathode the potential of the extinguished cathode falls from $V_3$ to $V_2$ and the corresponding trigger tube is extinguished upon the next negative portion of the $V_5$ potential and remains extinguished, thereby extinguishing the number outlined by the cathode of the cold cathode indicating tube. If the glow in the multi-cathode counting tube moves to the next electrode the cycle of operations is repeated and the outline of the number of the next corresponding cathode of the cold cathode indicating tube is illuminated so as to present the outline of the numeral in the cold cathode indicating tube which corresponds to the cathode of the multi-cathode counting tube which is then glowing.

Figure 6:
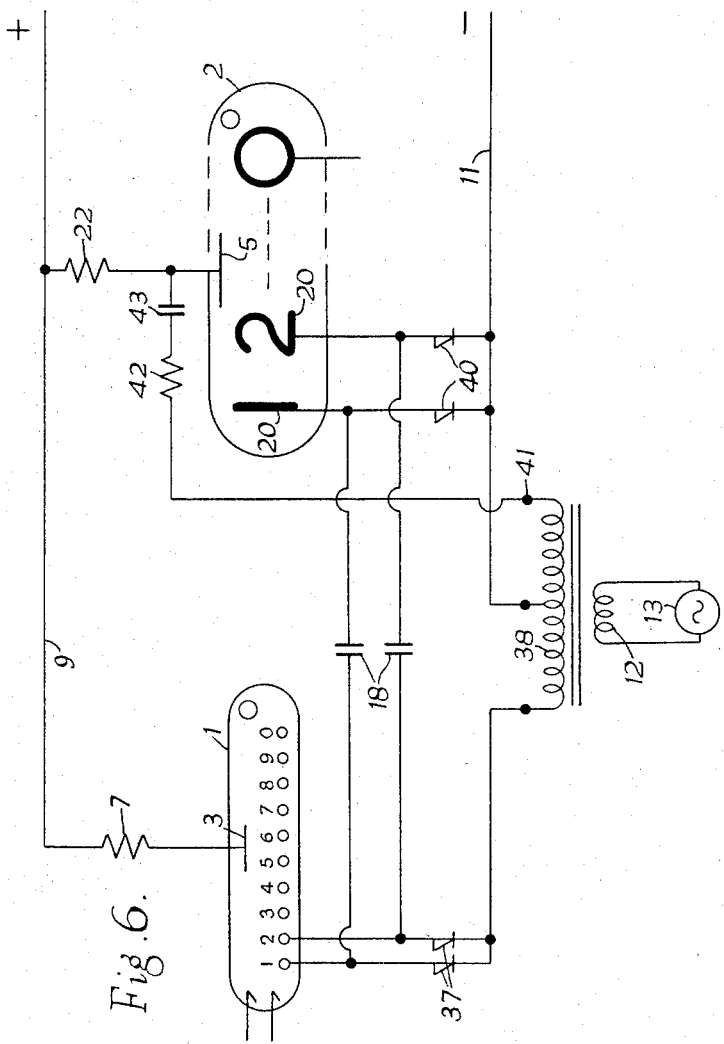

The circuit arrangement for carrying the invention into effect as illustrated in Figure 6 comprises a multi-cathode stepping electronic counting tube 1 having the anode 3 thereof connected to the positive lead 9 of a source of direct current supply through a current regulating resistor 7. The circuit of each cathode of the stepping electronic counting tube 1 includes a diode, and a portion 38 of the secondary winding 39 of a transformer, from which is taken a tapping to the negative lead 11 of the source of direct current supply.

A gas-filled cold cathode indicating tube 2 is provided with current regulating resistor 22 connected between the anode 5 thereof and the positive lead of the source of direct current. Each circuit of the cathodes 20 of the gas-filled cold cathode number tube is completed through a diode, to the negative lead of the source of direct current supply.

Corresponding cathodes of the stepping electronic counting tube 1 and the gas-filled cold cathode indicating tube 2 are connected by capacitors 18.

The end 41 of the secondary winding of the transformer remote from the diodes 37 connecting the cathodes of the multi-cathode stepping electronic counting tube 1 to the negative lead of the source of direct current is connected by way of a resistor 42 and a coupling capacitor 43 to the anode 5 of the gas-filled cold cathode indicating tube 2. The primary winding 12 of the transformer is supplied from a source of alternating current 13.

It will be appreciated that when the source of potential is connected to a circuit such as that indicated above a glow discharge will appear at one cathode only of the stepping electronic counting tube. A glow will also appear in the gas-filled cold cathode indicating tube, but this glow will be spread over many if not all of the cathodes with all the diodes 40 connecting the cathodes of the gas-filled cold cathode indicating tube to the negative lead of the source of direct current conducting.

In a specific illustration of the invention it will be assumed that the glow is resting on the second cathode of the multi-cathode stepping electronic counting tube.

The effects of the application of the alternating current supplied to the primary winding 12 of the transformer is best considered several cycles after the alternating current has been initially switched on. The value of the anode current of the multi-cathode stepping electronic counting tube 1 will exceed that flowing in the gas-filled cold cathode indicating tube 2. The divided cathode currents in the gas-filled cold cathode indicating tube 2 maintain all the diodes 40 connecting the cathodes of the gas-filled cold cathode indicating tube 2 to the negative lead 11 of the source of direct current in a conducting condition whilst the diodes 37 connecting the cathodes of the multi-cathode stepping electronic counting tube 1 to the negative lead 11 of the source of direct current draw current from the coupling capacitors 18 which connect corresponding cathodes of the multi-cathode stepping electronic tube and the gas-filled cold cathode indicating tube. Without any cathode current in the multi-cathode stepping electronic counting tube, this would quickly charge all the capacitors 18 coupling the corresponding cathodes of the multi-cathode stepping electronic tube to the cathodes of the gas-filled cold cathode indicating tube equally with a potential equal to half the excursion at the cathodes of the diodes 37 connecting the cathodes of the multi-cathode stepping electronic counting tube to the negative lead 11 of the source of current, and in consequence all the cathodes of the stepping electronic counting tube would remain at this negative potential. This condition will only prevail in respect of those cathodes of the multi-cathode stepping electronic counting tube which are not connected to the circuit by a glow discharge current to the anode. The second cathode of the multi-cathode stepping electronic counting tube follows positively the upward excursion of the cathode of the diode connecting the second cathode of the multi-cathode stepping electronic counting tube to the negative source of direct current and current is also drawn from the capacitor 18 coupling the second cathode of the multi-cathode stepping electronic counting tube with the second cathode of the gas-filled cold cathode indicating tube and through the diode connecting the second cathode of the gas-filled cold cathode indicating tube to the negative lead of the source of direct current.

The negative potential swing at the cathodes of the diodes connecting the cathodes of the multi-cathode stepping electronic counting tube to the negative lead of the source of direct current now only affects the diode 37 connecting the second cathode of the multi-cathode stepping electronic counting tube to the negative lead of the source of direct current. As this negative potential falls, so also does negative potential at the second cathode of the gas-filled cold cathode indicating tube because the diode 40 connecting the second cathode of the gas-filled cold cathode indicating tube fails to conduct in this direction. The polarity of the charge in capacitor 18 coupling the second cathode of the multi-cathode stepping electronic counting tube with the second cathode of the gas-filled cold cathode indicating tube becomes the reverse of that in the capacitors 18 coupling the remaining cathodes of the multi-cathode stepping electronic counting tube to the remaining cathodes of the gas-filled cold cathode indicating tube. Also the second cathode of the gas-filled cold cathode indicating tube has a negative going potential excursion equal to the full amplitude of swing at second cathode of the multi-cathode stepping electronic counting tube, whilst the remainder of the cathodes of the gas-filled cold cathode indicating tube are unaffected.

The secondary of the transformer supplies a potential swing to the anode 5 of the gas-filled cold cathode indicating tube 2 through a coupling circuit comprising the resistor 42 and the capacitor 43. The potential swing at the anode 5 of the gas-filled cold cathode indicating tube is the reverse of that at the second cathode of the gas-filled cold cathode indicating tube with the result that anode current flows to the second cathode of the gas-filled cold cathode indicating tube during this half cycle of the alternating current supply. Anode current is drawn both from the resistor 22 connecting the anode 5 to the positive lead 9 of the source of direct current as also from the capacitor 43 of the coupling connecting the transformer to the anode of the gas-filled cold cathode indicating tube. This current flows almost entirely to the second cathode of the gas-filled cold cathode indicating tube which is more negative than the remainder.

During the other half cycle, when all the cathodes of the gas-filled cold cathode indicating tube are at equal potential, the glow current is cut off by the lowered anode potential. The current in resistor 22 connecting the anode of the gas-filled cold cathode indicating tube to the positive lead of the source of direct current then restores the charge in the capacitor 43 connecting the anode 5 of the gas-filled cold cathode indicating tube 2 to the secondary winding 38 of the transformer.

It may be assumed that the value of the capacitors 18 which couple corresponding cathodes of the multi-cathode stepping electronic counting tube and the gas-filled cold cathode indicating tube is sufficient to render negligible the change in potential across the capacitor coupling the second cathodes of both the multi-cathode stepping electronic tube and the gas-filled cold cathode indicating tube during the half cycle that the second cathode current flows from this capacitor. It is evident that a current of equal value flows in the diode connecting the second cathode of the gas-filled cold cathode indicating tube to the negative lead 11 of the source of current during the other half cycle of the supply, to restore the charge in this capacitor.

A few cycles only of the alternating current source are sufficient to re-adjust the charges in the coupling capacitors when the glow in the multi-cathode stepping electronic counting tube transfers to the next adjacent cathode.

Figure 7:
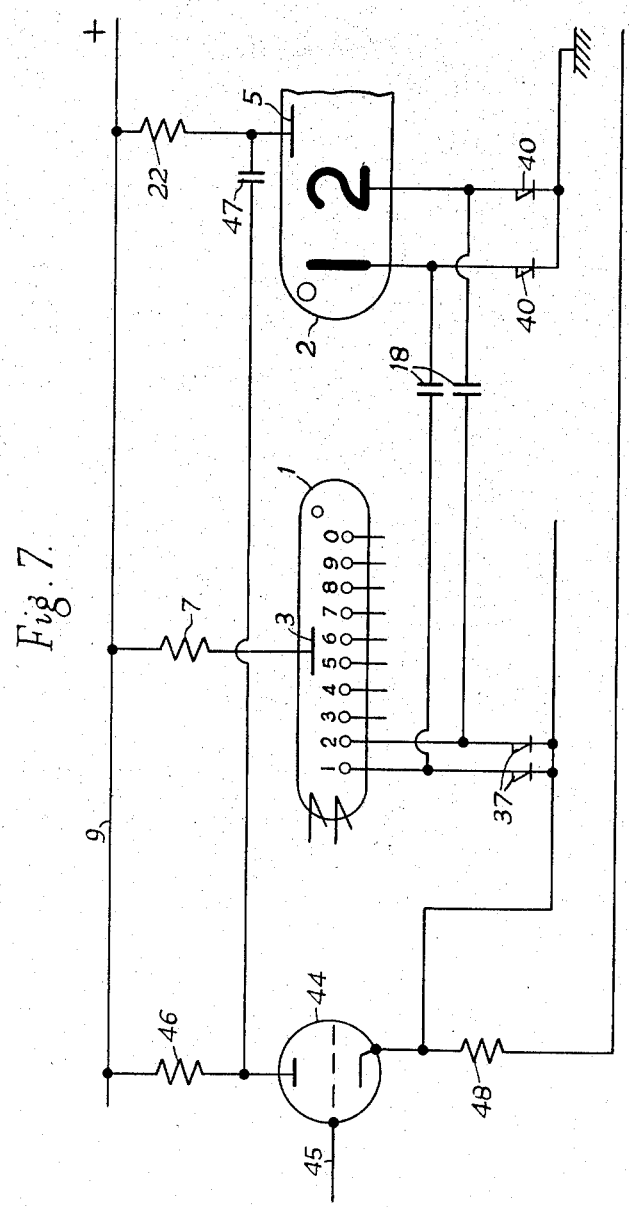

A modification of the arrangement hereinbefore described with reference to Figure 6 is illustrated in Figure 7 and consists in replacing the source of alternating current 13 and the transformer by a thermionic valve 44 which receives an alternating potential at the control grid 45 thereof and supplies opposing phases from the anode and the cathode circuits.

In the modified arrangement the anode of the thermionic valve is connected to the positive lead 9 of the source of current through a resistor 46 and to the anode of the gas-filled cold cathode indicating tube through a capacitor 47, whereas the cathode of the valve 44 is connected to the negative lead of the source of current through a resistor 48 and is connected to each cathode of the multi-cathode stepping electronic counting tube through a diode 37. As in the arrangement hereinbefore described, corresponding cathodes of the multi-cathode electronic counting tube 1 and the gas-filled cold cathode indicating tube 2 are coupled by a capacitor 18.

In such an arrangement the input of the thermionic valve may be a rectangular or pulsed waveform which improves the duty cycle and therefore the efficiency of the circuit operation.

In some circumstances the frequency of the pulsating source applied at the grid 45 of the valve 44 may with advantage be that employed for driving the multi-cathode stepping electronic counting tube 1.

Thus it will be seen that according to the present invention there is provided a simple and efficient means of producing in a gas-filled cold cathode indicating tube the illuminated representation of the numeral which a glowing cathode in a multi-cathode stepping electronic counting tube represents.

What we claim as our invention and desire to secure by Letters Patent of the United States is:

1. An electrical circuit including a multi-cathode counting tube, a cold cathode indicating tube, means interconnecting corresponding cathodes of the two tubes to derive from a glowing cathode of the multi-cathode counting tube a potential which assists in drawing the glow in the cold cathode indicating tube to the cathode thereof which corresponds to the glowing cathode of the multi-cathode counting tube, and means to periodically reduce the potential between the anode and the cathodes of said indicating tube to a value below the minimum potential necessary to sustain discharge in said indicating tube.

2. An electrical circuit in which a multi-cathode counting tube and a cold cathode indicating tube have the corresponding cathodes thereof interconnected by means operable in conjunction with the potential of the glowing cathode of the multi-cathode counting tube to apply to the cathode of the cold cathode indicating tube a potential of reversed polarity to that of the corresponding glowing cathode of the multi-cathode counting tube, and means to periodically reduce the potential between the anode and the cathodes of said indicating tube to a value below minimum potential necessary to sustain discharge in said indicating tube.

3. An electrical circuit connecting a multi-cathode counting tube to a cold cathode indicating tube in which a discharge between the anode and a cathode of the multi-cathode counting tube is modulated and the resulting alternating current is rectified to produce a potential of negative polarity which is applied to the corresponding cathode of the cold cathode indicating tube to concentrate a discharge between the anode of the indicating tube and the corresponding cathode of the cold cathode indicating tube, and means to periodically reduce the potential between the anode and the cathodes of said indicating tube to a value below minimum necessary to sustain said last-mentioned discharge in said indicating tube.

4. An electrical circuit connecting a multi-cathode counting tube to a cold cathode indicating tube as claimed in claim 3, wherein the anode of the multi-cathode counting tube is connected to a source of modulated direct current.

5. An electrical circuit connecting a multi-cathode counting tube to a cold cathode indicating tube as claimed in claim 4, wherein the modulated direct current is obtained from an alternating current source through a rectifier and a partially effective smoothing circuit.

6. An electrical circuit connecting a multi-cathode counting tube to a cold cathode indicating tube as claimed in claim 5, wherein each cathode of the multi-cathode counting tube is connected to the corresponding cathode of the cold cathode indicating tube through a series capacitor and a shunt rectifier.

7. An electrical circuit connecting a multi-cathode counting tube to a cold cathode indicating tube as claimed in claim 5, wherein the anode of the cold cathode indicating tube is connected to a source of modulated direct current, there being a phase difference of 180° between the modulation of the current supplying the multi-cathode counting tube and the modulation of the current supplying the cold cathode indicating tube.

8. An electrical circuit connecting a multi-cathode counting tube to a cold cathode indicating tube as claimed in claim 7, including a transformer having a primary winding connected to a source of alternating current and a secondary winding wherein a centre tap of the secondary winding is connected to all the cathodes of the multi-cathode counting tube through individual resistors and to all the cathodes of the cold cathode indicating tube through individual rectifiers wherein one end of the secondary winding is connected through a rectifier and a resistor to the anode of the multi-cathode counting tube and the other anode of the secondary winding is connected through a rectifier and a resistor to the anode of the cold cathode indicating tube and wherein a capacitor is connected between the junction of each of said rectifier resistor combinations and the centre tap of the secondary winding of the transformer.

9. An electrical circuit connecting a multi-cathode counting tube to a cold cathode indicating tube as claimed in claim 7, including a transformer having a primary winding connected to a source of alternating current and a secondary winding wherein a centre tap of the secondary winding is connected to all the cathodes of the cold cathode indicating tube through individual rectifiers wherein one end of the secondary winding is connected through a resistor and a capacitor to the anode of the cold cathode indicating tube and through a resistor, capacitor and resistors to the anode of the multi-cathode counting tube the other end of the secondary winding being connected to all the cathodes of the multi-cathode counting tube through individual rectifiers and wherein a capacitor is connected between each of the corresponding cathodes of the multi-cathode tubes and the cold cathode indicating tube.

10. An electrical circuit connecting a multi-cathode counting tube to a cold cathode indicating tube as claimed in claim 3, wherein the potential of the glowing electrode of the multi-cathode counting tube is modulated by means of an alternating potential.

11. An electrical circuit connecting a multi-cathode counting tube to a cold cathode indicating tube as claimed in claim 10, wherein the anode of the multi-cathode counting tube is connected through a resistor and the secondary winding of a transformer to the positive lead of a direct current source and each cathode is connected through a resistor to the negative lead of said direct current source.

12. An electrical circuit connecting a multi-cathode counting tube to a cold cathode indicating tube as claimed in claim 10, wherein the potential of the glowing cathode of the multi-cathode counting tube is modulated through the medium of a thermionic valve.

13. An electrical circuit connecting a multi-cathode counting tube to a cold cathode indicating tube as claimed in claim 3, in which each cathode of the multi-cathode counting tube is connected to the corresponding cathode of the cold cathode indicating tube through a circuit comprising a capacitor and a diode.

14. An electrical circuit connecting a multi-cathode counting tube to a cold cathode indicating tube as claimed in claim 3, in which means are provided for smoothing the rectified potential applied to the corresponding cathode of the cold cathode indicating tube.

15. An electrical circuit connecting a multi-cathode counting tube to a cold cathode indicating tube as claimed in claim 3, wherein the anode of the cold cathode indicating tube is connected to a source of positive potential through a resistor for the purpose of reducing periodically the potential between the anode and cathode of said indicating tube.

16. An electrical circuit connecting a multi-cathode counting tube to a cold cathode indicating tube as claimed in claim 3, wherein the anode of the cold cathode indicating tube is connected to a negative source of potential through a capacitor for the purpose of reducing periodically the potential between the anode and cathode of said indicating tube.

17. An electrical circuit connecting a multi-cathode counting tube to a cold cathode indicating tube as claimed in claim 3, wherein a resistor and a capacitor connected in series and shunted by a capacitor are connected to the anode of the cold cathode indicating tube as and for the purpose of reducing periodically the potential between the anode and cathode of said indicating tube.

18. An electrical circuit comprising a multi-cathode counting tube, a cold cathode indicating tube, means interconnecting corresponding cathodes of the said two tubes operable to convert a positive potential resulting from a discharge between the anode and a glowing cathode of the multi-cathode counting tube into a negative potential at the corresponding cathode of the cold cathode indicating tube sufficient to draw and maintain a discharge between the anode and the cathode of the cold cathode tube corresponding to the glowing cathode of the multi-cathode counting tube, and means for periodically effecting a momentary reduction of the potential between the anode and the cathodes of the cold cathode indicating tube to a value below the minimum potential necessary to maintain said last-named discharge.

19. An electrical circuit according to claim 18, wherein said interconnecting means include a gas discharge relay tube.

20. An electrical circuit comprising a multi-cathode stepping tube, a multi-cathode cold cathode indicating tube, separate means coupled between each cathode of said stepping tube and a separate cathode of said indicating tube responsive to conduction at such stepping tube cathode to lower the potential at such indicating tube cathode, and means to periodically extinguish conduction in said indicating tube.

21. An electrical circuit comprising a multi-cathode stepping tube, a multi-cathode cold cathode indicating tube, a trigger tube in series with each cathode of said indicating tube, separate means coupling each cathode of said stepping tube to a separate one of said trigger tubes to fire the latter upon conduction in said stepping tube between the anode and such cathode thereof, and means to periodically extinguish conduction in said indicating tube.

References Cited in the file of this patent

UNITED STATES PATENTS

| | | |
|---|---|---|
| 2,142,106 | Boswau | Jan. 3, 1939 |
| 2,575,370 | Townsend | Nov. 20, 1951 |
| 2,696,572 | Schmid | Dec. 7, 1954 |
| 2,769,939 | Williams | Nov. 6, 1956 |
| 2,817,815 | Evans | Dec. 24, 1957 |
| 2,860,286 | Ost | Nov. 11, 1958 |